(12) United States Patent
Carstensen

(10) Patent No.: US 6,636,475 B2
(45) Date of Patent: Oct. 21, 2003

(54) COMPACT DISK STORAGE DEVICE

(76) Inventor: Wayne T. Carstensen, P.O. Box 224, Tualatin, OR (US) 97062-0224

( * ) Notice: Subject to any disclaimer, the term of this patent is extended or adjusted under 35 U.S.C. 154(b) by 93 days.

(21) Appl. No.: 09/847,021

(22) Filed: May 1, 2001

(65) Prior Publication Data

US 2002/0163877 A1 Nov. 7, 2002

(51) Int. Cl.$^7$ ................................................ G11B 3/70
(52) U.S. Cl. ...................................................... 369/281
(58) Field of Search ................................. 369/281, 282, 369/289, 290; 360/98.08, 99.05, 99.12; 206/307.1, 308.1, 309–313

(56) References Cited

U.S. PATENT DOCUMENTS

| | | | |
|---|---|---|---|
| 2,501,465 A | 3/1950 | Caramanoff | 274/42 |
| 4,195,733 A | * 4/1980 | Abel | 206/308.3 |
| 4,253,571 A | * 3/1981 | Keohan | 206/308.3 |
| 4,316,281 A | 2/1982 | Prusak | 369/291 |
| 4,556,968 A | 12/1985 | Pelkey et al. | 369/287 |
| 4,589,104 A | 5/1986 | Brockley | 369/291 |
| 4,613,921 A | 9/1986 | Holmes | 360/133 |
| 4,736,840 A | 4/1988 | Deiglmeier | 206/313 |
| 4,793,480 A | 12/1988 | Gelardi et al. | 206/312 |
| 5,299,186 A | 3/1994 | Tsurushima | 369/291 |
| 5,423,434 A | * 6/1995 | Chen | 211/40 |
| 5,757,765 A | 5/1998 | Chen | 369/291 |
| 5,848,687 A | 12/1998 | Shultz | 206/308 |
| 6,192,025 B1 | 2/2001 | Chen | 369/291 |
| D439,435 S | 3/2001 | Belden, Jr. et al. | D6/407 |

* cited by examiner

Primary Examiner—George J. Letscher
(74) Attorney, Agent, or Firm—Law Office of Timothy E. Siegel; Timothy E. Siegel

(57) ABSTRACT

A system for storing a set of disks, each disk having a first major surface and a second major surface opposed to the first major surface and defining a uniform central aperture. The system comprises a set of spacers, any one of which is adapted to cooperatively engage any of the others. A first one of the spacers is placed on the first major disk surface in a first position and orientation and a second one of the spacers engages with the first spacer by being placed on the second major disk surface in a position and orientation coincident with the first position and orientation except for being spaced apart from it by the thickness of the disk. In this configuration, the first one of the spacers is retained on the first major surface and the second one of the spacers is retained on the second major surface.

13 Claims, 3 Drawing Sheets

COMPACT DISK STORAGE DEVICE

BACKGROUND OF THE INVENTION

The present invention is a system and method for storing disks. In a specific embodiment the present invention may be adapted to facilitate the storage of CD-ROM type disks.

The problem of neatly storing of CD-ROM type disks ("CDs"), preferably in a space and time efficient manner, is a problem that is encountered by many people in our society. It is becoming increasingly common to purchase this type of disk without the familiar clear plastic square cover. Although these disks are more resilient to damage than old phonograph records, it is nevertheless advisable to not have the major surfaces of these disks touching in the storage process and therefore rubbing during retrieval. Any process that is time consuming, even to the limited point of finding the cover, opening it, placing the disk inside and closing the cover, may meet with disuse in practice, resulting in an untidy heap of CDs.

A number of CD storage solutions have been offered, some of them, such as slotted cabinets have good practicality for many users. Others, such as a ring that fits about the exterior rim of the CD and permits stacking, have yet to be widely adopted, perhaps because of the time needed for use.

What is, therefore, needed but not yet available is a CD storage system and method that can be used very quickly, without a great commitment of time. The system would preferably be flexible, permitting the CDs to be stored in any combination of stacks. Moreover, ideally the system would permit the easy location of any particular CD.

SUMMARY

In a first separate aspect the present invention is a system for storing a set of disks, each disk having a first major surface and a second major surface opposed to the first major surface and defining a uniform central aperture. The system comprises a set of spacers, any one of which is adapted to cooperatively engage any of the others. A first one of the spacers is placed on the first major disk surface in a first position and orientation and a second one of the spacers engages with the first spacer by being placed on the second major disk surface in a position and orientation coincident with the first position and orientation except for being spaced apart from it by the thickness of the disk. In this configuration the first one of the spacers is retained on the first major surface and the second one of the spacers is retained on the second major surface.

In a second separate aspect, the present invention is a method for placing a set of disks into spaced physical engagement with one another, each disk having a first major surface and a second major surface opposed to the first major surface and defining a uniform central aperture. The method comprises providing a set of spacers, wherein any first one of the spacers is adapted to cooperatively engage any second one of the spacers when the first one of the spacers is placed on a first major disk surface in a first position and the second one of the spacers is placed on a second major disk surface in a position coincident with the first position, except for being spaced apart by the disk. A user places a first one of the spacers on a first side of a disk and a second one of the spacers on the second side of the same disk, in the same position except for spaced apart from the first spacer by the disk. Then, the user positions a second disk so that its first major surface is spaced from the first disk by the second spacer. Finally the user positions a third spacer on the second major surface of the second disk, so that it is engaged with the second spacer, and both first and second disk are retained together.

In a third separate aspect, the present invention is a spacer adapted to be used in the storage of CD-ROM style disks. The spacer comprises a spacing and disk-engaging portion, defining an inner aperture and comprising a first planar portion, extending along a first plane. A first projection, projects outwardly away from the first plane and is sized to snugly fit into and be retained by the central aperture of a CD-ROM style disk. In addition, a spacer engaging projection projects outwardly from the spacing and disk-engaging portion, away from the first plane and is adapted to fit into and be retained by a the inner aperture of an identical spacer.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figures 1, 2:
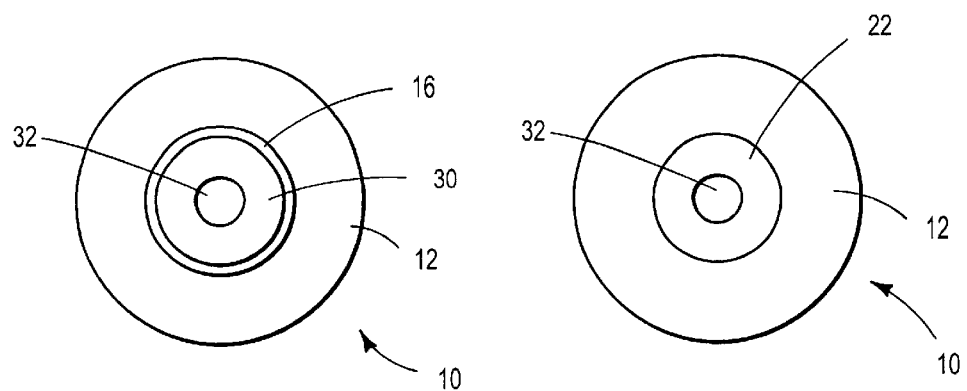
FIG. 1 is a top view of a spacer according to the present invention.
FIG. 2 is a bottom view of a spacer according to the present invention.
Figure 3:
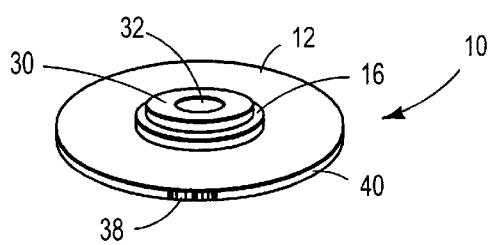
FIG. 3 is a perspective view of a spacer according to the present invention.
Figure 4:
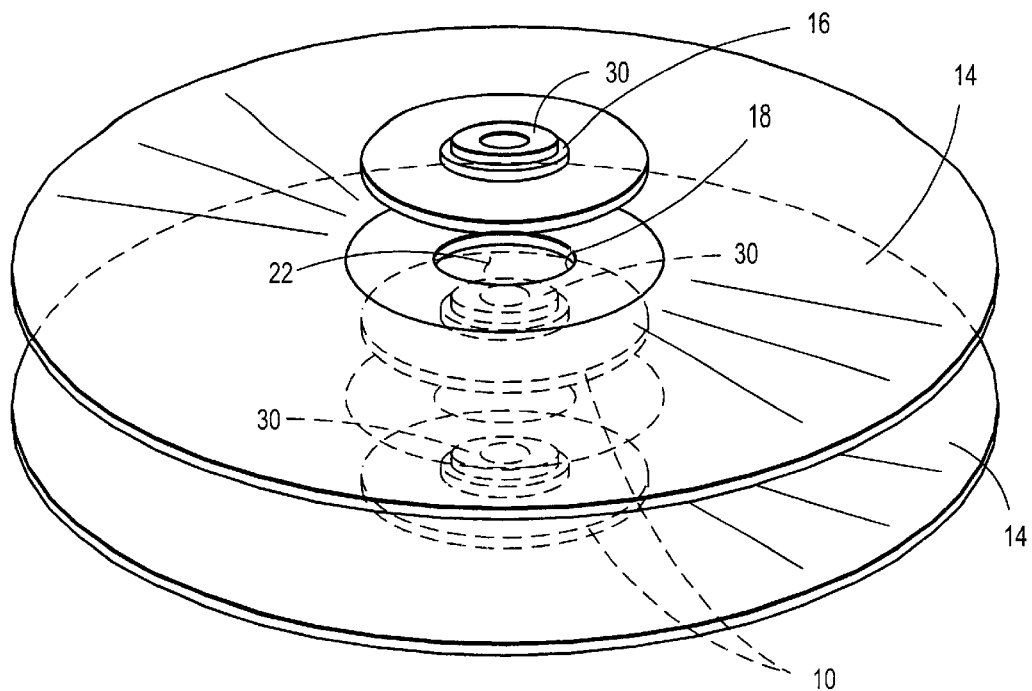
FIG. 4 is a perspective view of a set of the spacers of FIG. 1 and disks placed for cooperative engagement, but spaced apart for clarity of presentation.

An exemplary spacer 10, a set of which and the use of which form the substance of the present invention, is shown in FIGS. 1–3. A first planar portion 12, is adapted to fit between a pair of disks 14 (See FIGS. 4–5) to prevent their surfaces from rubbing. A first projection 16, projects outwardly, away from the plane of the planar portion 12 and is sized to snugly fit in an inner rim 18 of an aperture 20 of each disk 14. In addition, first planar portion 12 defines an inner aperture 22, coincident to first projection 16. Together, planar portion 12 and first projection 16 form a spacing and disk-engaging portion.

A spacer engaging portion 30 projects outwardly from first projection 16, again away from the plane of first planar portion 12. Spacer engaging portion 30 is sized and shaped so that portion 30 of a first spacer 10 will fit snugly into the inner aperture 22 of a second spacer 10'.

Figure 5:
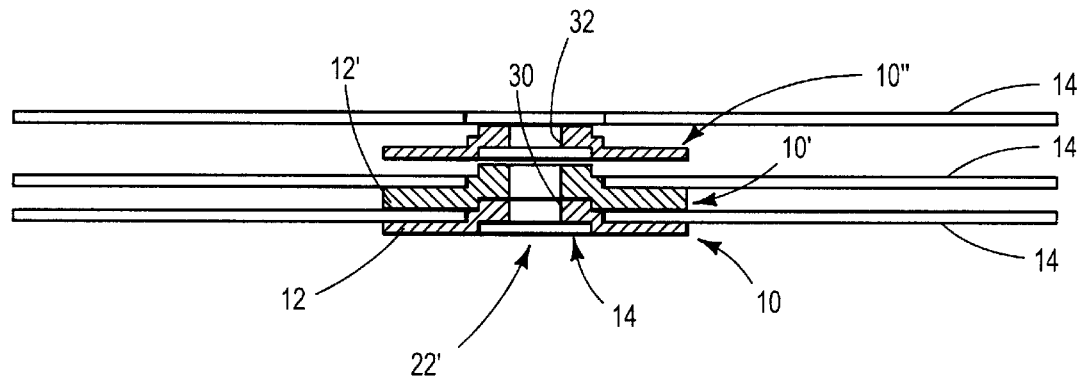
FIG. 5 is a side view of a set of disks engaged together by a set of the spacers of FIG. 1.

In one preferred embodiment, as shown in FIG. 5, the planar portion 12 of a first spacer 10 is not as thick as the planar portion 12' of a second spacer 10'. A user could place the thicker spacer 10' to denote a break point in his system of disk organization. Additionally, bar codes, colors, letters or other indicia 38 could be placed on the sides 40 of the spacers and could be associated with the disk contents to enable a user to easily find a compact disk of interest. Future distributors of compact disks may choose to supply a marked spacer in conjunction with a compact disk, to ease the handling tasks of their customers.

Figure 7:
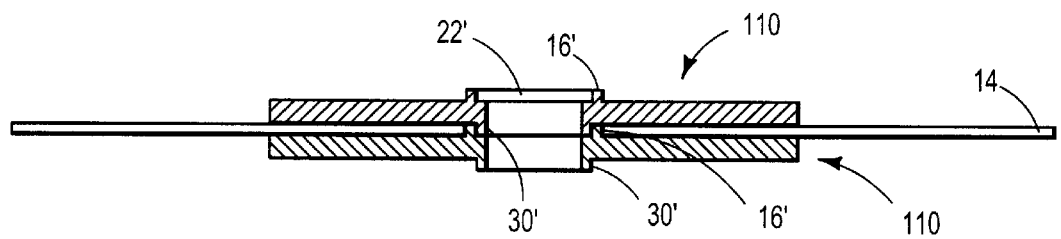
FIG. 7 is a side view of a disk and two spacers, according to an alternative preferred embodiment of the present invention, engaged together.
Figure 6:
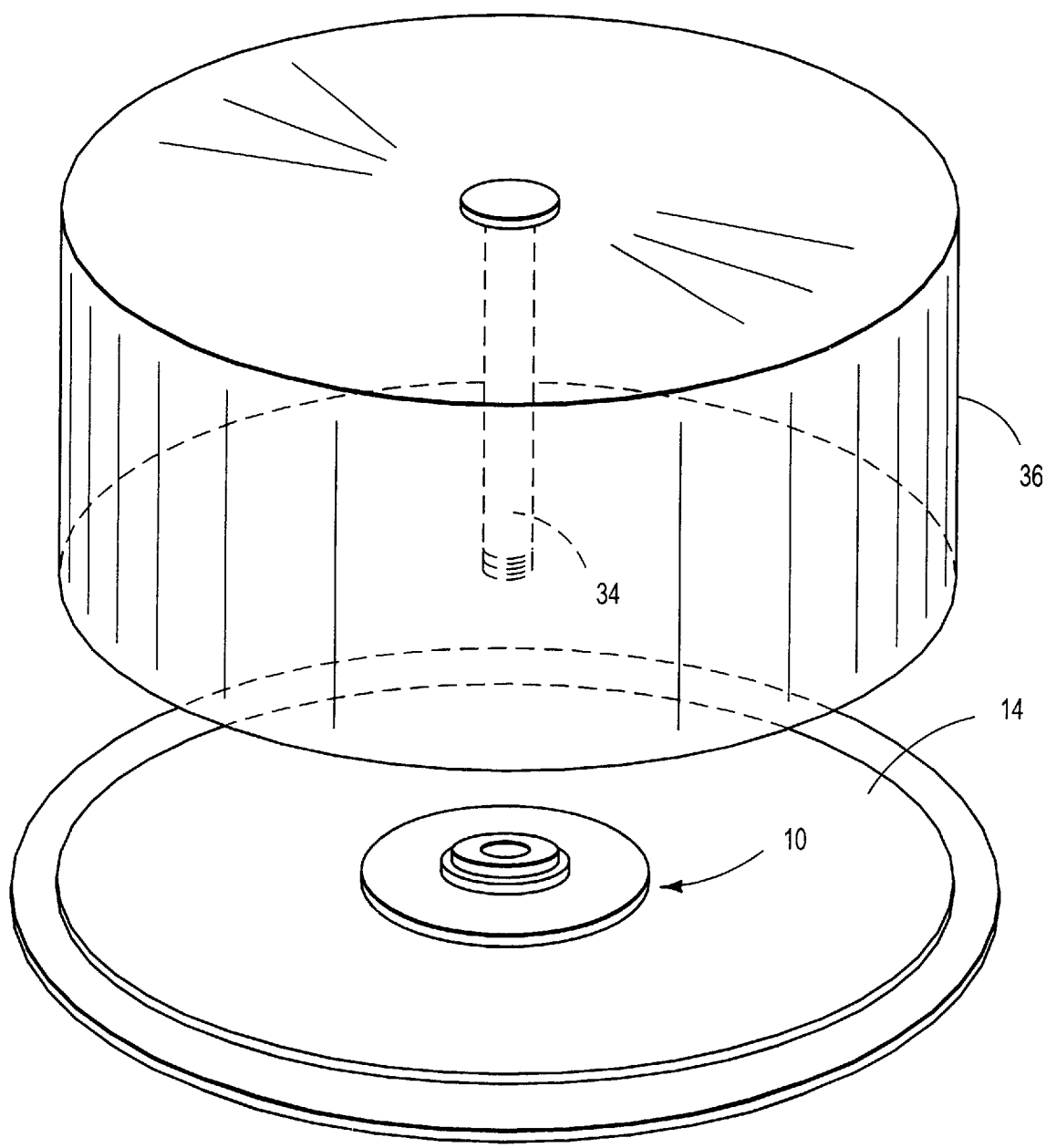
FIG. 6 is a perspective view of a post-supported dust cover adapted to cooperate with spacers according to the present invention.

In an alternative embodiment of a spacer 110, shown in FIG. 7 the spacer engaging portion 30' projects in the opposite direction of the first projection 16', and is sized to fit in an aperture 22' defined in projection 16'. In both embodiments, there is a central aperture 32 or 32', to permit a post 34 (FIG. 6), supporting a dust cover 36 (FIG. 6) to be threaded through the engaged disks 14. In an additional preferred embodiment the spacers 10 are magnetic. In this embodiment, the mechanical mating portions, that is spacer engaging portion 30, aperture 20 and rim 18, of spacers 10 may or may not be present.

The terms and expressions which have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A system for storing a set of computer readable media disks, each disk having a first major surface and a second major surface opposed to said first major surface and defining a uniform central aperture, said system comprising a set of magnetic spacers, any first said magnetic spacers adapted to cooperatively mechanically engage any second one of said magnetic spacers when said first one of said magnetic spacers is placed on said first major surface in a first position and orientation and said second one of said magnetic spacers is placed on said second major surface in a position and orientation coincident with said first position and orientation except for being spaced apart from it by the thickness of said disk, so that said first one of said magnetic spacers is retained on said first major surface and said second one of said magnetic spacers is retained on said second major surface.

2. The system of claim 1 wherein each said spacer includes a planar portion, extending in two dimensions along a plane and an engagement projection projecting outwardly perpendicularly to said plane in a first direction from said first major surface, being sized to fit within a said aperture of a said disk and defining a receptive space projecting inwardly from said second major surface in said first direction and adapted to receive an engagement projection from another one of said spacers, thereby permitting two of said spacers to be mechanically fitted together through a said aperture of a said disk.

3. The system of claim 2 wherein there is a first subset of spacers having a planar portion of a first thickness and a second subset of spacers having a planar portion of a second thickness at least 1.2 times greater than said first thickness.

4. The system of claim 3 wherein said spacers are also adapted to engage the rim of said uniform aperture of any one of said set of disks thereby retaining itself in physical engagement to said any one of said set of disks.

5. A method for placing a set of computer readable media disks into spaced physical engagement with one another, each disk having a first major surface and a second major surface opposed to said first major surface and defining a uniform central aperture, said method comprising,
(a) providing a set of magnetic spacers, any first one of said magnetic spacers adapted to mechanically engage any second one of said magnetic spacers when said first one of said magnetic spacers is placed on said first major surface in a first position and said second one of said magnetic spacers is placed on said second major surface in a position otherwise coincident with said first position;
(b) positioning a first magnetic spacer on said first major surface of a first disk;
(c) positioning a second magnetic spacer on said second major surface of said first disk, so that it is engaged with said first magnetic spacer;
(d) positioning a second disk so that its first major surface is spaced from said first disk by said second magnetic spacer; and
(e) positioning a third magnetic spacer on said second major surface of said second disk, so that it is engaged with said second magnetic spacer.

6. The method of claim 5 wherein additional disks are engaged in like manner using additional spacers.

7. The method of claim 5 wherein each said spacer includes a planar portion, extending in two dimensions along a plane and an engagement projection projecting outwardly perpendicularly to said plane in a first direction from said first major surface, being sized to fit within a said aperture of a said disk and defining a receptive space projecting inwardly from said second major surface in said first direction and adapted to receive an engagement projection from another one of said spacers, thereby permitting two of said spacers to be mechanically fitted together through a said aperture of a said disk.

8. The method of claim 7 wherein there is a first subset of spacers wherein said planar portion has a first thickness and a second subset of spacers wherein said planar portion has a second thickness at least 1.2 times greater than said first thickness.

9. The method of claim 5 wherein said spacers are also adapted to engage the rim of said uniform aperture of any one of said set of disks thereby retaining itself in physical engagement to said any one of said set of disks.

10. A set of spacers adapted to be used in the storage of CD-ROM style disks, each said spacer comprising:
(a) a spacing and disk engaging portion, defining an inner aperture and comprising:
(i) a first planar portion, extending along a first plane; and
(ii) a first projection, projecting outwardly away from said first plane and sized to snugly fit into and be retained by the central aperture of a CD-ROM style disk; and
(b) a spacer engaging projection, projecting outwardly from said spacing and disk engaging portion, away from said first plane and being adapted to fit into and be retained by a said inner aperture of an identical spacer; and
(c) wherein said set of spacers includes a first set of spacers and a second set of spacers and wherein said planar region of said first set of spacers has a first thickness and said planar region of a second set of spacers has a second thickness and wherein said second thickness is at least 1.2 times said first thickness.

11. The spacer of claim 10 wherein said inner aperture is defined by said first planar portion and said spacer engaging projection projects outwardly from said first projection.

12. The spacer of claim 10 wherein said first projection projects outwardly in a first direction, said inner aperture is defined by said first projection and said spacer engaging projection projects outwardly from said first planar portion in a second direction, opposite to said first direction.

13. The spacer of claim 10, also being magnetically charged.

* * * * *

UNITED STATES PATENT AND TRADEMARK OFFICE
CERTIFICATE OF CORRECTION

PATENT NO. : 6,636,475 B2
DATED : October 21, 2003
INVENTOR(S) : Wayne T. Carstensen It is certified that error appears in the above-identified patent and that said Letters Patent is hereby corrected as shown below:

Title page, Item [54] and Column 1, line 1,
Title, change "COMPACT DISK STORAGE DEVICE" to
-- COMPACT DISK STORAGE SYSTEM AND METHOD --

Column 3,
Line 26, between "first" and "said" add -- one of --
Line 51, change claim "3" to claim -- 1 --
Line 61, between "to" and "mechanically" add -- cooperatively --

Signed and Sealed this

Ninth Day of March, 2004

JON W. DUDAS
*Acting Director of the United States Patent and Trademark Office*